May 25, 1965  Q. L. FLOREY ETAL  3,184,789
APPARATUS FOR LARGE-SCALE APPLICATION OF MONOMOLECULAR
LAYERS TO WATER SURFACES USING MELTED MATERIAL
Original Filed June 30, 1961

INVENTORS
QUENTIN L. FLOREY
LLOYD O. TIMBLIN, JR.
BY
*Ernest S. Cohen*
*Gersten Sadowsky*
ATTORNEYS — 
United States Patent Office 3,184,789
Patented May 25, 1965

3,184,789
APPARATUS FOR LARGE-SCALE APPLICATION OF MONOMOLECULAR LAYERS TO WATER SURFACES USING MELTED MATERIAL
Quentin L. Florey, Denver, and Lloyd O. Timblin, Jr., Boulder, Colo., assignors to the United States of America as represented by the Secretary of Interior
Original application June 30, 1961, Ser. No. 121,261. Divided and this application Apr. 7, 1964, Ser. No. 362,548
4 Claims. (Cl. 18—2.4)

This is a division of application Serial No. 121,261, filed June 30, 1961.

The invention herein described and claimed may be manufactured and used by or for the Government of the United States of America for governmental purposes without the payment of royalties thereon or therefor.

This invention relates to a means for distributing or spreading evaporation retarder or suppressor materials on the surface of water in open storage as in lakes or reservoirs. Known retarder materials are effective by forming a monomolecular layer or thin tenacious film on the surface of the water. Extensively used for this purpose are the higher fatty alcohols such as hexadecanol (cetyl alcohol). When they are applied to water surfaces they spontaneously form the desired monomolecular film, the rate of formation being dependent among other things, upon the particle size of the retarder material. The films form most rapidly from finely divided powder.

Because of the low melting points of retarder materials, a fine powder thereof has an inherent tendency to fuse into lumps, particularly during shipment. As a result handling and application of such powdered materials become very difficult. This difficulty is avoided by means of the present invention since the physical form of the hexadecanol, or similar retarder material to be initially supplied for use in this invention, is of no particular significance. Nevertheless, by means of the invention, the material actually distributed or spread upon the surface of the water is in the requisite finely divided powdered state.

Basic to the present invention is the concept of melting the solid higher fatty alcohol material, and spraying the resulting liquid as a fine mist into the atmosphere over the water to be conserved. The fine mist of molten alcohol will immediately cool to form a finely divided powder which is then carried for some distance downwind and is deposited on the water surface. A monolayer of the higher fatty alcohol forms rapidly from this finely divided powder to reduce the amount of evaporation taking place at the water surface. Since the direction and force of the wind determine the final disposition of the finely divided powder, a control arrangement which is operable in response to such wind factors is utilized to regulate the operation of the spray means.

Therefore, an object of the present invention is to provide an efficient and economical means of applying higher fatty alcohols and like evaporation retarding materials as monomolecular layers to surfaces on stored water, to act as an evaporation retarder.

Another object of the invention is to provide means for temporarily converting higher fatty alcohols normally in the solid state, and maintaining them in a fluid state whereby such alcohols are easily applied as a finely divided powder, to surfaces on stored water.

A further object of the invention is to provide means for eliminating handling problems associated with the direct application of higher fatty alcohols in solid form to a surface of stored water.

In order that the invention may be more clearly understood reference will now be had to the accompanying drawing which shows by way of example only, a preferred embodiment thereof.

Figure 1:
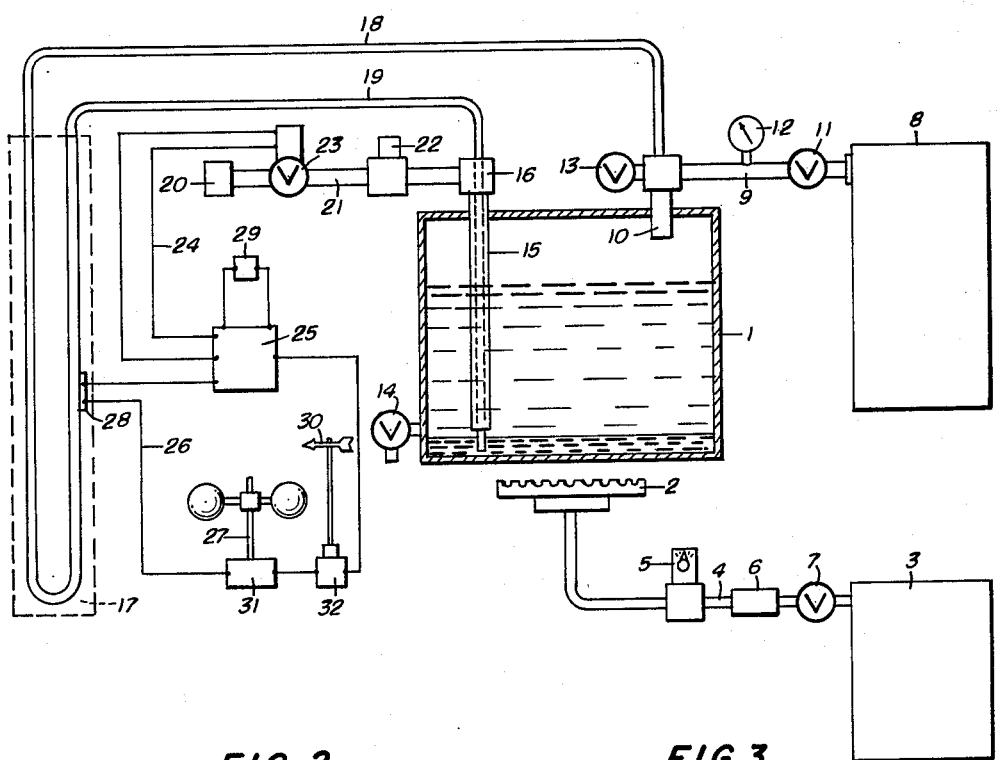
FIG. 1 is a block diagram and flow sheet of a stationary installation based upon the principles of the invention.

Referring to FIG. 1, the system shown comprises a storage and pressure tank 1, wherein a higher fatty alcohol evaporation retarding material is maintained as a molten liquid at a temperature of 150° to 160° F. by the heat from burner 2, having its fuel supplied from a tank 3. On the fuel line 4 are conventional controls including a thermostat control 5, and a pressure regulator 6, adjusted to obtain a proper working pressure in the line. The molten retarding material is also maintained under a head of pressure by air or one of the inert gases supplied from a gas storage tank 8, at about 100 to 125 p.s.i. pressure, to the space in the tank 1 above the molten material. A supply line 9 connecting tank 8 to an inlet means 10 in the top of tank 1, includes a pressure regulator 11, pressure gage 12, and a relief valve 13 set to maintain pressures below 125 p.s.i. Of course, the range of temperatures and pressures previously noted as appropriate for the maintenance of tank 1, may be extended in accordance with the size of this tank, and the material and form used in its construction. Other connections to tank 1 include a liquid material supply inlet 14, in the lower portion of the tank, and a liquid material outlet pipe 15 opening near the bottom of the tank, and extending out through the top of the tank to a coupling 16. A liquid level U-tube manometer type indicator 17 is connected to tank 1 to sense the pressures at the top and bottom of the tank through connecting piping 18 and 19, joined to inlet means 10, and coupling 16, respectively. Connecting pipe 19 extends through the coupling 16 and outlet pipe 15 to the bottom of the tank 1. A layer of water at the bottom of the tank permits the pressure gage to measure pressure differentials in the tank without the molten higher fatty alcohol entering the gage tube and rising to the outside where it would freeze and block the gage. The lower end of pipe 15 is above the water level so that no water is discharged when the valve opens.

Also shown in FIG. 1 is spray nozzle 20 supplied with the molten higher fatty alcohol through an outlet conduit 21, having a filter 22 therein, and connected to the coupling 16. Possible clogging of the nozzle by the solidification of the higher fatty alcohol between spray bursts, is prevented by mounting the nozzle in a heated chamber, comprising a small sheet metal box in which a gas "pilot light" is mounted about 8 inches below the nozzle. A suitable alternative for the gas light heater would be a small electric heating coil fixed in place next to the nozzle. The top and bottom of this heat chamber are perforated with a number of small holes, to provide ventilation for the burner. Regulation of the operation of the spray nozzle 20 is effected by means of a solenoid operated valve 23 connecting the conduit 21 to the nozzle. The solenoid of the valve 23 is electrically connected by leads 24 across a controller mechanism 25, the latter being serially connected in a circuit 26 with separate switch means 31, and 32 operable by an anemometer 27 and a wind vane 30, respectively, and a level responsive means 28 on the liquid level indicator 17. A power supply 29, connected to the controller 25 provides the energy for the electrical circuit arrangements.

Any fully automatic normally closed solenoid operated valve of conventional construction, would be applicable in the arrangement of FIG. 1, as a means to regulate the fluid flow to nozzle 20. Exemplary forms of such valves are disclosed in FIG. 5 of Patent 2,441,434, to Metzger, issued May 11, 1948, and in the figure of Patent 2,472,389, to Von Stoeser, issued June 7, 1949. Filter 22, may also be one of conventional design such as a T-type having a straining element of perforated Monel metal sheet in cylindrical form in the path of the fluid flow. Suitable for use as a spray nozzle 20, would be nearly any one of the simple devices found on paint or water sprays. A selection of the specific form of nozzle would depend on the working pressure, discharge rate, and the spray shape desired for its operation. The nozzle chosen for the preferred embodiment provides a fan-shaped spray of particles of the liquid retarding material, the predominance of which are around .003 inch in diameter, or roughly 75 microns.

The controller mechanism 25, circuit 26, and the separate switch means 28, 31, and 32, of the preferred embodiment, are constructed, arranged and operated as fully disclosed in the co-pending application Serial No. 121,259, of even date, of L. T. Cleaver, on which issued Patent No. 3,117,586, dated January 14, 1964 assigned to the assignee in this case. Switch 28, sensing the level in the manometer 17, as an indication of the level of the contents in tank 1, may take the form of an electromagnetic device as disclosed in the aforementioned Patent No. 2,472,389 to Von Stoeser, or a thermal responsive mechanism as disclosed in Patent No. 2,761,924, to Keenan, issued September 4, 1956. Switch 31, operatively responsive to a rotative movement of the shaft of anemometer 27, to produce intermittent signal pulses, could be any form of a cam operated switch. A typical device of this type is found in Patent No. 2,757,251, to Ingres, issued July 31, 1956. Mechanism 30, which is rotatable to sense wind direction, is operative to maintain circuit 26 completed at switch 32, only when the direction sensed is within an arc of about 90 degrees defining the limits in which dispensing of the retarding material would be effective to cover the water to be conserved. A wind from offshore and generally in the direction of the spray from nozzle 20, would be within such limits. A suitable construction for switch 32 would comprise a contacting finger aligned with the vane of mechanism 30, and attached to turn with its shaft so as to ride on a stationary arcuate conductive segment fixed in position to span the wind directions within the aforesaid limits. Reference to Patent No. 2,407,154, to Hildebrand et al., issued September 3, 1946, discloses in FIG. 2, a rotatable mercury switch tube which may be conveniently adapted for the purposes of the present invention, to sense the arcuate position of the wind vane. By limiting the mercury to cover 90 degrees of the switch tube of this patent, there would be provided a means having a rotatable contacting element its outer seal terminal fixed to the wall of the rotatable tube, and as the limits defining arcuate segment, its effectively stationary supply of mercury. The wind direction indicator disclosed in Patent 2,836,064 to York, issued May 27, 1958, also provides a teaching for making switch 32.

To prepare the apparatus for use, molten higher fatty alcohol is pumped into the storage tank 1, through supply inlet 14. Thermostatically controlled burner 2, maintains the material in a molten state. Pressure regulator 11 is adjusted so as to subject the contents of the tank to the pressure supplied by tank 8, which is sufficient to force the molten higher fatty alcohol through the spray nozzle and form a fine mist in the atmosphere when the valve 23 is operated to permit flow to the nozzle. Filter 22 is operative in a conventional manner to prevent clogging materials from reaching the nozzle.

In operation, valve 23 is intermittently actuated by the controller mechanism 25 to cause a flow of molten higher fatty alcohol therethrough in short bursts. The frequency of the bursts and the duration of each, are determined as functions of wind velocity. As fully explained in the aforementioned co-pending application, controller 25 in cooperation with the anemometer 27 controls the operational timing of valve 23 so that below approximately 3 miles per hour of wind, the flow of molten alcohol to nozzle 20 remains cut-off. Above 3 miles per hour of wind the bursts of fine mist from the nozzle increases until a wind velocity of approximately 20 miles per hour is experienced. At wind velocities greater than 20 miles per hour, the rate of bursts is again reduced to zero. Tests have shown that at higher velocities further applications of the retarder material are ineffective, since in high winds the film is rapidly swept away and destroyed by surface currents, large waves, and whitecaps generated in the water. A wind blowing from the body of water toward the spraying means, which would be effective to open switch 32 of the wind direction sensing means 30, is of course also operative to cause the solenoid 23 to cut off flow to nozzle 20. Further control of the solenoid operated valve 23 is derived from the switch 28 actuated by the means responsive to the level in the U-tube 17, wherein the valve is again cut-off when the higher fatty alcohol level drops below a predetermined point, to avoid having this level fall below the opening of pipe 15 in the tank.

Field studies have indicated that certain amounts of the long chain fatty alcohols are required to maintain a monomolecular film on a body of water, depending upon a number of environmental factors. Prevailing wind conditions are among the most important of these factors, it having been found that the amount of material required varies with wind speeds. Having once determined the number and location of dispensing units to be used at a water storage area or reservoir, and the discharge characteristics of the nozzles under the operating pressures chosen, and knowing the number of times the anemometer will energize the controller for any given wind speed, it next becomes necessary to determine the length of time the valve should remain open each time it operates, to give a preselected dispensing rate.

The frequency of dispensing bursts is determined by the controller as governed by the anemometer switch means 31, which in this illustration of the invention makes contact once every second in a 60 mile-per-hour wind, once every 3 seconds in a 20 mile-per-hour wind, and once every 12 seconds in a 5 mile-per-hour wind.

To select the proper duration for each valve opening, consideration must be given to the following factors, all of which may be determined in laboratory or field investigations:

(a) Mean wind velocities at the chosen reservoir site.
(b) Desired rate of material application for maintaining a monolayer (pounds per acre per day).
(c) Number of dispensers to be installed and assumed to be operating at any given time.
(d) Discharge rates for the nozzle selected under a given operating pressure.

For an example of the necessary computation to estimate the "valve open" time required, assume (a) a mean wind speed of 6 miles per hour; (b) a required application of 0.2 pound per acre-day; (c) that four dispensers are operating at any given time; and that the mean reservoir surface area is equal to 1000 acres. For the nozzle selected and for a working temperature and pressure of 160 degrees F., and 75 p.s.i. respectively, a discharge rate of 500 ml. in 96 seconds was measured. This is equivalent to 0.132 gallon per 96 seconds or $$\frac{0.132 \text{ gal.}}{96 \text{ sec.}} \times \frac{0.1337 \text{ ft.}^3}{\text{gal.}} \times \frac{62.4 \times 0.82 \text{ lb.}}{\text{ft.}^3} \times \frac{3600 \times 24 \text{ sec.}}{\text{day}}$$

or 810 lb./day.

At an application rate of 0.2 pound per acre-day to a 1000 acre reservoir, a total of 200 pounds of material would be required. Then each of the four dispensers assumed to be operating would supply 50 pounds per day. At a wind speed of 6 miles per hour, the valve would open every 10 seconds, and the "valve open" time required to dispense 50 pounds per day would be $$\frac{50}{810} \times 10 = 0.6 \text{ sec.}$$

In the controller disclosed in the aforesaid co-pending application, a positionable switch arm is provided to select the computed "valve open" time from among five time steps in the range of 0.15 to 1.5 seconds.

Although the controller 25 is eminently suitable for directing the operation of the dispensing equipment in accordance with the requirements determined by the speed and direction of the wind, and the retarding material content of tank 1, it is clear that the immediate actuation of the valve structure in the mechanism 23, needs only a simple stroke drive easily accomplished by a hand operation. Consequently, the invention may be conveniently practiced by a human operator noting the indications of the various pertinent conditions, and in position to manually operate the valve structure of mechanism 23. In one form of the invention, anemometer 27 would have co-operating therewith a speed indicator such as a tachometer, facing the operator who also takes cognizance of the wind direction from the vane of mechanism 30, and the content level of the tank 1, from the manometer 17. The frequency and duration of the individual spray bursts would naturally depend on the number and length of the individual simultaneous occurrences of suitable conditions as noted by the operator having a hand on the manually operated valve control.

Figure 2:
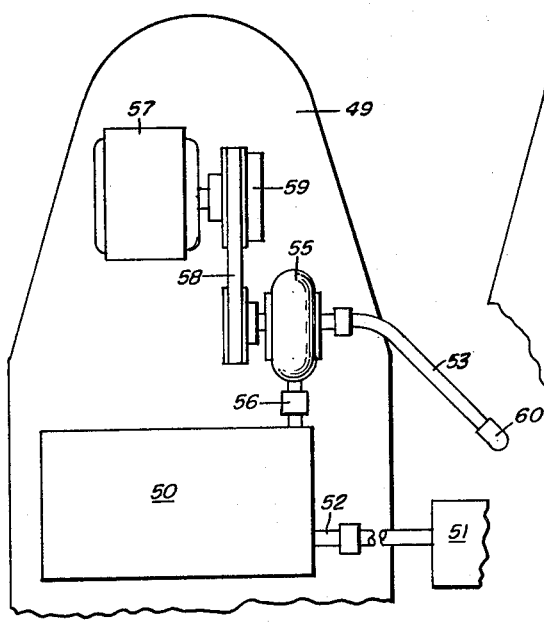
FIG. 2 is a similar illustration of a mobile installation having means to cooperate with and service the stationary arrangement of FIG. 1.
Figure 3:
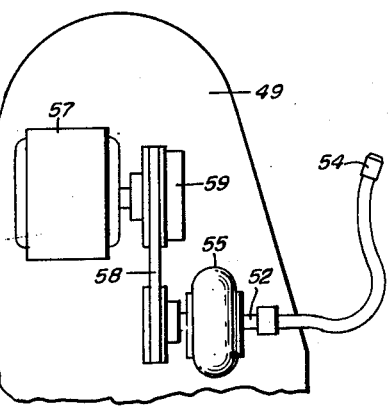
FIG. 3 is a fragmentary elevational view of a modification of a component part of FIG. 2.

With the spray apparatus of FIG. 1 mounted on a mobile base, wind responsive control devices are not needed. Valve actuation and spray nozzle operation may be manually controlled and directed to easily compensate for varying wind speed and direction. The mobile arrangement of FIG. 2 provides a boat 49 as the mobile base. Mounted on suitable deck space is an insulated storage tank 50 having thermostatically controlled external electrical heating applied thereto. Higher fatty alcohol in a molten state at about 180° F. is supplied to tank 50 as needed, through hose 52, connectible to a central melting furnace supply tank 51 wherein solid higher fatty alcohol may be melted and stored in that form. Tank 51 may be a stationary plant on shore or on an appropriate floating platform. A hose 53 having a detachable spray nozzle 54 fixed to one end, is connected at its opposite end to a gear pump 55. The gear pump withdraws the molten higher fatty alcohol from tank 50 through a filter 56, and supplies this evaporation retarding material at about 140° F. and under pressure of about 125 p.s.i., to hose 53 and spray nozzle 54. A drive for the gear pump may include a conventional pump motor 57 operatively connected to the pump through a pulley system 58 having a centrifugal clutch 59.

In using the installation of FIG. 2, the tank 50 is supplied with molten material as previously explained. Boat 49 is then moved about on the body of water in any convenient manner to facilitate the spreading of the fine powder from the mist spray of molten higher fatty alcohol emerging from the nozzle 54, as an evenly distributed layer of retarding material upon the surface of the water. Wind considerations are accounted for and corrections applied by the operator manually directing the nozzle 54, in an obvious manner.

An alternative use for the FIG. 2, arrangement as a material supply means for the stationary installation as shown in FIG. 1, requires that the nozzle 54 on hose 53, be replaced by a quick connect coupling 60. In this case, tank 50 becomes a transfer storage means to receive a supply of the molten higher fatty alcohol from a remote stationary storage such as tank 51, and in turn carry the supply on boat 49 to one or more stationary installations spotted around the shoreline of the water storage. A disclosure for an exemplary prior art plural installation arrangement may be found in Patent 2,878,098, to Treloar et al., issued March 17, 1959. In operation, hose 53 is extended to position coupling 60 for connection to the supply inlet 14 of a stationary installation. After the connection is made, pump means 56 to 59 are made operative to transfer the molten higher fatty alcohol from tank 50 to tank 1 of the stationary installation.

Although the insulating qualities of the transfer hoses prevent freezing while material is being pumped through them, it is necesary to keep the hoses warm or to flush them between transfer operations. Hose 52 through which molten higher fatty alcohols are transferred from the melting tank 51 to the transfer tank 50, is simply flushed with hot water after each use. Hose 53 used to transfer material from transfer tank 50, to the dispenser pressure tank 1, is stored in an insulated compartment on top of the transfer tank 50. In this compartment the heat from the molten material in the tank raises the temperature sufficiently to prevent freezing of any fatty alcohol that may remain in the hose after use. An alternative method of keeping the hoses clear when not in use, is to purge them with air after each use. The gear pump 55, and filter 56, are also mounted in the insulated compartment above the transfer tank to prevent their freezing. Spray nozzle 54 will not freeze during operation, but it is necessary to flush this device with hot water or to store it in the insulated compartment between spraying operations to prevent freezing of material in it.

In a convenient utilization of a system having both stationary and mobile installations, the mobile set-up makes the initial application of the retarding material to the surface of the body of water, and is then converted to operate as a transfer means for servicing the stationary installations.

All of the long-chain alcohols that are either liquid at normal room temperatures or that can be liquefied at temperatures up to about 160° F. can be dispensed with this equipment. This invention is primarily intended for use with alcohols having carbon chains of from 14 to 22 atoms in length or for any mixture of these alcohols. Alcohols with carbon chains of 12 or less are normally liquid at room temperatures and could also be dispensed by conventional spray equipment. Alcohols with carbon chain lengths above 22 are not presently available in quantities sufficient to be attractive for this application. It is conceivable that as the longer chain alcohols become available, their physical characteristics will permit dispensing of them with the subject apparatus. Many other pure liquids or mixtures that are sufficiently fluid in the operating temperature ranges of this equipment could also be melted, stored, pressurized, sprayed, and otherwise manipulated with this apparatus. Water, paraffins, light oils, etc. would fall in this category. For example high melting point materials may in some instances be mixed with suitable solvents whereby there is attained for the mixture a melting point sufficiently low to permit its use in accordance with the present invention.

Among other uses to which the instant apparatus and method are easily adapted is the spraying of herbicides and insecticides over land areas, as well as water surfaces for the control of weeds and insects. By properly preparing food stuffs for spraying over areas of water surfaces, the present invention may provide a convenient and efficient means and procedure for feeding fish. In addition, such operations as covering the surface of oil in storage reservoirs to retard evaporation, would be facilitated by the invention herein. It is clear from what has been previously explained, that the only essential requirements for materials or mixtures thereof, to be used in the manner taught by the invention are (a) that they have a relatively low melting point; and (b) that they are solids at ambient temperatures such that a fine powder is formed from a mist thereof in contact with the atmosphere.

The instant invention permits a more economical operation since the less costly flake form of the solid higher fatty alcohol may be used to produce the molten form. Previously only the expensive finely divided powder form was considered practicable in evaporation control operations. Problems in handling due to the presence of fused lumps in the solid material are also eliminated since all the solid higher fatty alcohol is first melted in accordance with the present invention.

Reasonable variations and modifications are possible within the scope of the foregoing disclosure and the appended claims to the invention.

We claim:

1. Apparatus for producing a finely divided powdered form of a higher fatty alcohol comprising a storage tank having inlet means for receiving the alcohol in a molten state, heating means for applying sufficient heat to the tank to sustain the alcohol in its molten state, a second inlet means connected to a pressure inducing means to create in said tank an elevated pressure, an outlet means on the tank communicating with a conduit means opening below the surface of the molten alcohol at approximately the bottom of the tank, a spray nozzle, a second conduit means connecting the spray nozzle to the outlet means, a valve in said second conduit, means controlling the valve to opened and closed conditions comprising a solenoid made operative to either one of its conditions by an electrical controller means, a means to sense the level of the molten alcohol in the tank, and a means to sense the wind velocity, each said sensing means having electrical switch means responsive thereto, circuit means including said electrical switch means and said controller means for determining the effectiveness of the solenoid upon the valve made operative thereby, whereby the molten alcohol under pressure is intermittently sprayed through said nozzle into a cooling atmosphere to form finely divided powder of higher fatty alcohol material.

2. An apparatus as in claim 1, the pressure inducing means comprising a storage of gas under pressure connected to said second inlet means.

3. An apparatus as in claim 1, including a second heating means in contact with said spray nozzle whereby the molten alcohol in the nozzle is maintained in its molten state.

4. An apparatus as in claim 1, including a filter means in said second conduit between the outlet means and the valve.

References Cited by the Examiner

UNITED STATES PATENTS

| | | | |
|---|---|---|---|
| 1,834,687 | 12/31 | Davis | 18—2.5 X |
| 1,992,611 | 2/35 | Grindrod | 18—2.5 X |
| 2,128,263 | 8/38 | Ofeldt | 239—135 X |
| 2,268,888 | 1/42 | Mericola | 18—2.7 X |
| 2,701,775 | 2/55 | Brennan | 18—2.5 X |
| 2,797,140 | 2/57 | Veatch | 21—60.5 |
| 2,878,098 | 3/59 | Treloar et al. | 21—60.5 X |
| 2,921,335 | 1/60 | Bowers | 18—2.7 |

FOREIGN PATENTS

| | | |
|---|---|---|
| 863,019 | 1/53 | Germany. |
| 30,025 | 1897 | Great Britain. |
| 506,032 | 12/54 | Italy. |

WILLIAM J. STEPHENSON, *Primary Examiner.*

MICHAEL V. BRINDISI, *Examiner.*